US010183585B2

(12) United States Patent
Furuhashi et al.

(10) Patent No.: US 10,183,585 B2
(45) Date of Patent: Jan. 22, 2019

(54) ABNORMALITY INFORMING AUTOMOTIVE VEHICLE

(71) Applicants: TOYOTA JIDOSHA KABUSHIKI KAISHA, Toyota-shi, Aichi-ken (JP); FUJITSU TEN LIMITED, Kobe-shi, Hyogo (JP)

(72) Inventors: Yusuke Furuhashi, Nisshin (JP); Fumiyoshi Kuribara, Toyota (JP); Daisuke Okajima, Kobe (JP)

(73) Assignees: Toyota Jidosha Kabushiki Kaisha, Toyota-shi, Aichi-ken (JP); Fujitsu Ten Limited, Kobe-shi, Hyogo (JP)

( * ) Notice: Subject to any disclaimer, the term of this patent is extended or adjusted under 35 U.S.C. 154(b) by 0 days.

(21) Appl. No.: 15/648,910

(22) Filed: Jul. 13, 2017

(65) Prior Publication Data
US 2018/0037123 A1     Feb. 8, 2018

(30) Foreign Application Priority Data

Aug. 8, 2016   (JP) .................................. 2016-155598

(51) Int. Cl.
*B60L 11/18*        (2006.01)
*B60L 3/00*         (2006.01)

(52) U.S. Cl.
CPC ......... *B60L 11/1824* (2013.01); *B60L 3/0023* (2013.01); *B60L 11/1803* (2013.01); *B60L 11/1816* (2013.01); *B60L 2250/10* (2013.01); *B60L 2250/16* (2013.01)

(58) Field of Classification Search
CPC ................ B60L 11/1824; B60L 3/0023; B60L 11/1803; B60L 2250/16; B60L 2250/10
See application file for complete search history.

(56) References Cited

U.S. PATENT DOCUMENTS 9,030,164 B2 *  5/2015  Mitsutani ............... B60K 6/445
                                                    320/104
2009/0057041 A1   3/2009  Kamaga
2010/0007306 A1   1/2010  Fukui et al.

FOREIGN PATENT DOCUMENTS

| EP | 2 439 098 A1 | 4/2012 |
| EP | 2 637 280 A1 | 9/2013 |
| EP | 2 778 002 A1 | 9/2014 |
| JP | 61-193946 | 8/1986 |
| JP | 2013-169099 | 8/2013 |

* cited by examiner

*Primary Examiner* — Rexford Barnie
*Assistant Examiner* — Terrence Willoughby
(74) *Attorney, Agent, or Firm* — Finnegan, Henderson, Farabow, Garrett & Dunner, LLP

(57) ABSTRACT

An automotive vehicle on which a motor for traveling, a battery configured to supply electric power to the motor, and a charging system configured to charge the battery, are installed. The automotive vehicle includes an abnormality informing unit configured to immediately inform occurrence of an abnormality regarding the charging system when the abnormality is detected, on a condition that the abnormality is a first abnormality that affects traveling, and inform occurrence of an abnormality when a next trip is started, on a condition that the abnormality is a second abnormality that does not affect traveling.

3 Claims, 3 Drawing Sheets

ABNORMALITY INFORMING AUTOMOTIVE VEHICLE

INCORPORATION BY REFERENCE

The disclosure of Japanese Patent Application No. 2016-155598 filed on Aug. 8, 2016 including the specification, drawings and abstract is incorporated herein by reference in its entirety.

BACKGROUND

1. Technical Field

The disclosure relates to an automotive vehicle, and more particularly to an automotive vehicle on which a charging system that charges a battery that can supply electric power to a motor for traveling is installed.

2. Description of Related Art

As one example of this type of automotive vehicle, an automotive vehicle that delivers a message regarding an abnormal part or site when there is an abnormality has been proposed (see, for example, Japanese Patent Application Publication No. 2013-169099 (JP 2013-169099 A)). In this vehicle, when an abnormality occurs, a limp-home traveling mode is set according to the abnormal part, and the vehicle travels in the limp-home mode. Through this notification of the abnormality and setting of the limp-home traveling mode, the user can appropriately drive the vehicle in the limp-home mode, and an influence on the traffic environment is reduced.

SUMMARY

However, if an abnormality regarding a charging system that charges a battery is detected during traveling of an electric vehicle, and a message about occurrence of the abnormality regarding the charging system is immediately delivered, the driver may excessively respond to the message about the abnormality. Meanwhile, it may be considered to handle an abnormality regarding the charging system, which is detected during traveling, by keeping from delivering a message about the abnormality to the driver. However, if the abnormality regarding the charging system affects traveling, the above manner of handling may not be said to be appropriate handling.

The disclosure provides an automotive vehicle in which, when there is an abnormality regarding a charging system for a battery that supplies electric power to a motor for traveling, the driver is informed of the abnormality at a more appropriate time.

An automotive vehicle includes a motor for traveling, a battery configured to supply electric power to the motor, a charging system configured to charge the battery, and an abnormality informing unit. The abnormality informing unit is configured to immediately inform occurrence of an abnormality regarding the charging system when the abnormality is detected, on a condition that the abnormality is a first abnormality that affects traveling, and inform occurrence of an abnormality when the next trip is started, on a condition that the abnormality is a second abnormality that does not affect traveling.

In the automotive vehicle of the disclosure, when an abnormality regarding the charging system that charges the battery is detected, and this abnormality is the first abnormality that affects traveling, the driver is immediately informed of occurrence of the abnormality. In this manner, the driver can immediately drive the vehicle in a limp-home mode and stop the vehicle. On the other hand, when the detected abnormality is the second abnormality that does not affect traveling, the driver is informed of occurrence of the abnormality when the next trip is started. Thus, the driver can be aware of occurrence of the abnormality before he/she starts driving the vehicle. Consequently, when an abnormality regarding the charging system occurs, the driver can be informed of the abnormality at a more appropriate time. In this connection, the time at which the next trip is started includes a point in time at which the system is started after it is stopped.

In the automotive vehicle of the disclosure, the abnormality informing unit may inform occurrence of an abnormality that affects traveling when the detected abnormality is the first abnormality, and may inform occurrence of an abnormality regarding the charging system when the detected abnormality is the second abnormality that does not affect traveling. With this arrangement, the driver can be informed of the type of the abnormality.

In the automotive vehicle of the disclosure, the charging system may include a charger configured to charge the battery using electric power from an external power supply. The abnormality that affects traveling may include at least one of a communication abnormality in the charging system and a malfunction of a connector configured to connect the charger with the external power supply in the charging system, while the abnormality that does not affect traveling may include an abnormality regarding a charging function of the charging system. Generally, when the connector of the charging system is connected to the external power supply, control for stopping traveling is performed. However, if there is a malfunction of the connector, it cannot be determined whether external charging is being performed, and it cannot be determined whether the control for stopping traveling is to be performed. Therefore, the malfunction of the connector is preferably classified as an abnormality that affects traveling. A communication abnormality in the charging system makes it impossible to correctly communicate or convey a connecting condition or malfunction of the connector; therefore, the communication abnormality is preferably classified as an abnormality that affects traveling. On the other hand, an abnormality regarding the charging function of the charging system merely makes it impossible to perform charging of the battery, and does not affect traveling; therefore, it is preferably classified as an abnormality that does not affect traveling. With the abnormalities thus classified, the driver can be informed of any abnormality regarding the charging system at a more appropriate time.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Next, one embodiment of the disclosure will be described.

Figure 1:
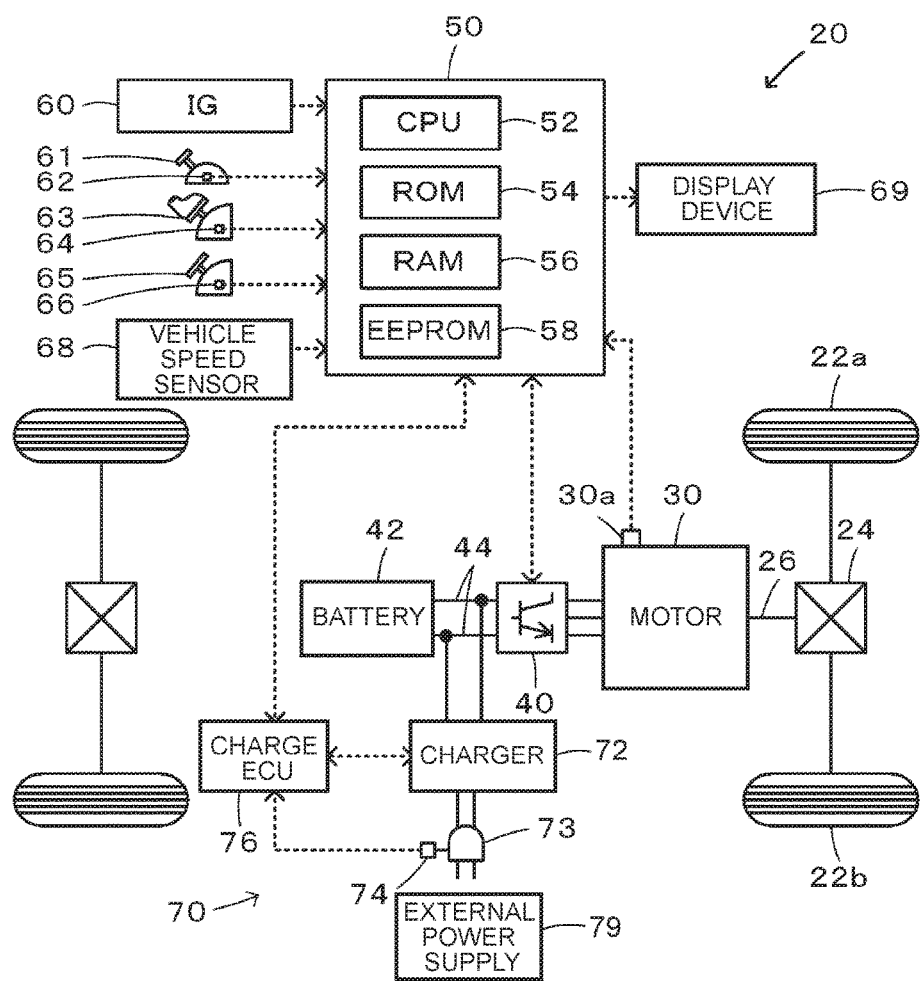
FIG. 1 is a view schematically showing the configuration of an electric vehicle as one embodiment of the disclosure.

FIG. 1 schematically shows the configuration of an electric vehicle 20 as one embodiment of the disclosure. As shown in FIG. 1, the electric vehicle 20 of this embodiment includes a motor 30, an inverter 40, a battery 42, a main electronic control unit (which will be called "main ECU") 50, and a charging system 70.

The motor 30 is configured as a synchronous generator-motor, for example, and is connected to a drive shaft 26 that is connected to drive wheels 22a, 22b via a differential gear 24. The inverter 40 is connected to the motor 30, and is also connected to the battery 42 via a power line 44. The main ECU 50 performs switching control on a plurality of switching devices (not shown) of the inverter 40, so that the motor 30 is rotated or driven. The battery 42 is configured as a lithium-ion secondary battery or a nickel-hydrogen secondary battery, for example, and is connected to the inverter 40 via the power line 44, as described above.

The charging system 70 includes a charger 72, and an electronic control unit 76 for charging (which will be called and denoted as "charge ECU" in FIG. 1). The charger 72 is connected to the power line 44, and is configured to charge the battery 42 using electric power from an external power supply 79, such as a household power supply or an industrial power supply, when a connector 73 is connected to the external power supply 79 at a charging point, such as one's home or a charging station. The charger 72 includes an AC/DC converter and a DC/DC converter that are not illustrated. The AC/DC converter converts AC power supplied from the external power supply 79 via the connector 73, into DC power. The DC/DC converter converts voltage of the DC power from the AC/DC converter, and supplies the resulting power to the battery 42 side. The AC/DC converter and the DC/DC converter are controlled by the charge ECU 76 when the connector 73 is connected to the external power supply 79, so that the charger 72 supplies electric power from the external power supply 79 to the battery 42.

The charge ECU 76 is configured as a microprocessor having CPU (not shown) as a main component, and includes ROM that stores processing programs, RAM that temporarily stores data, input and output ports, communication port, and so forth, as well as CPU. The charge ECU 76 receives, via the input port, signals from various sensors mounted on the charger 72, a connection signal from a connection switch 74 that is mounted on the connector 73 and used for determining whether the connector 73 is connected to the external power supply 79, and other signals. The charge ECU 76 outputs control signals to the AC/DC converter and DC/DC converter of the charger 72 via the output port. The charge ECU 76 communicates with the main ECU 50, and supplies and receives various kinds of information to and from the main ECU 50.

The main ECU 50 is configured as a microprocessor having CPU 52 as a main component, and includes ROM 54 that stores processing programs, RAM 56 that temporarily stores data, EEPROM 58 as a non-volatile memory that stores and holds data, input and output ports, communication port, and so forth. The main ECU 50 receives signals from various sensors via the input port. The signals received by the main ECU 50 include, for example, a rotational position θm of the motor 30 from a rotational position detection sensor 30a that detects the rotational position of a rotor of the motor 30, phase currents Iu, Iv, Iw from current sensors that detect current flowing through each phase of the motor 30, and so forth. The signals also include voltage Vb of the battery 42 from a voltage sensor installed between terminals of the battery 42, and current Ib of the battery 42 from a current sensor mounted on an output terminal of the battery 42. Further, the signals include an ignition signal from an ignition switch 60, shift position SP from a shift position sensor 62 that detects a position to which a shift lever 61 is operated, accelerator pedal stroke Acc from an accelerator pedal position sensor 64 that detects the amount of depression of an accelerator pedal 63, brake pedal position BP from a brake pedal position sensor 66 that detects the amount of depression of a brake pedal 65, and the vehicle speed V from a vehicle speed sensor 68. The main ECU 50 outputs various control signals via the output port. The signals generated from the main ECU 50 include, for example, switching control signals to a plurality of switching devices (not shown) of the inverter 40, display control signal to a display device 69 mounted on an instrumental panel in front of the driver's seat, and so forth. The main ECU 50 computes the angular velocity ωm and rotational speed Nm of the motor 30, based on the rotational position θm of the rotor of the motor 30 from the rotational position detection sensor 30a, and computes the power storage ratio SOC of the battery 42, based on the integrated value of current Ib of the battery 42 from the current sensor. The power storage ratio SOC of the battery 42 is the ratio of the amount of electric power that can be discharged from the battery 42 to the total capacity of the battery 42. The main ECU 50 communicates with the charge ECU 76, and supplies and receives various kinds of information to and from the charge ECU 76.

The electric vehicle 20 of the embodiment constructed as described above travels by causing the main ECU 50 to perform drive control based on the driver's operation. The drive control is basically performed by setting required torque Tp* required to be produced by the drive shaft 26, based on the accelerator pedal stroke Acc and the vehicle speed V, setting a torque command Tm* of the motor 30 by limiting the required torque Tp* to the maximum permissible output Tlim of the motor 30 (providing an upper-limit guard), and performing switching control on the switching devices of the inverter 40 so that the motor 30 is driven according to the torque command Tm*.

Figure 2:
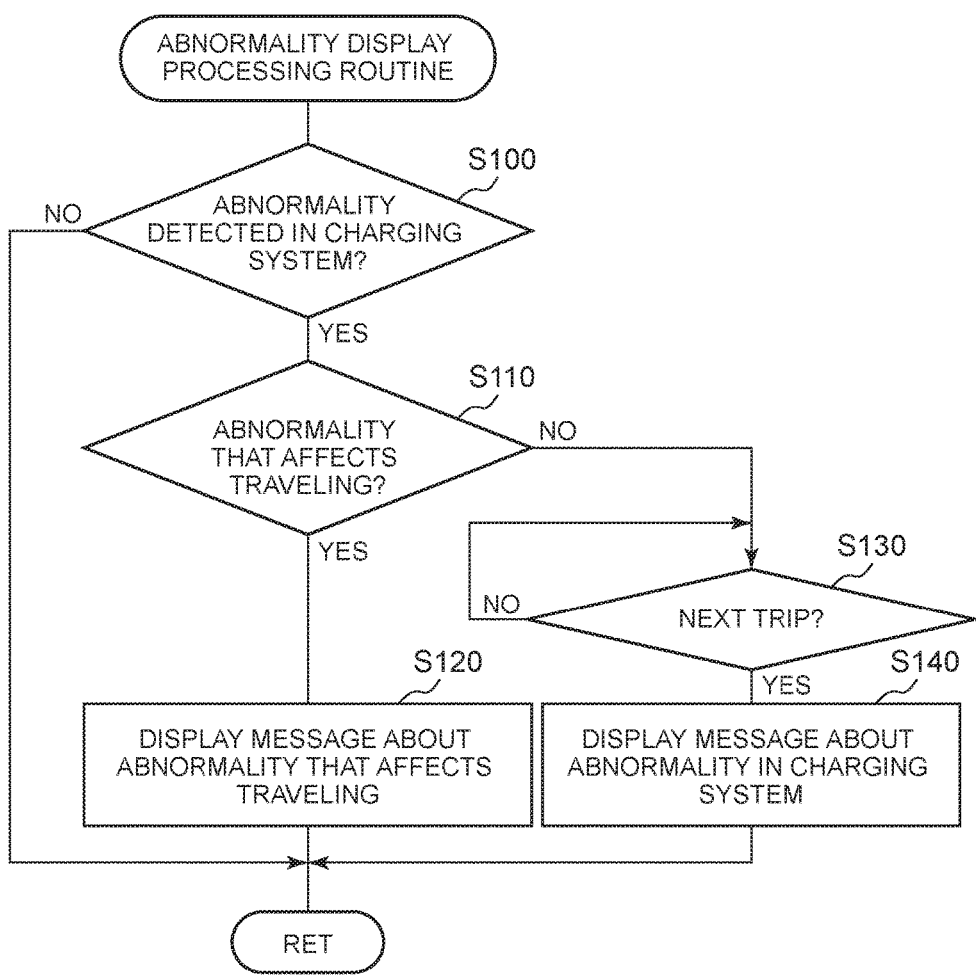
FIG. 2 is a flowchart illustrating one example of abnormality display processing routine executed by a main electronic control unit.

In the electric vehicle 20 of this embodiment, when an abnormality is detected at the start of the system or upon regular checking for abnormalities during traveling, a message is displayed on the display device 69. FIG. 2 is a flowchart illustrating one example of abnormality display processing routine executed by the main ECU 50 so as to display a message on the display device 69 when there is an abnormality regarding the charging system 70 (which will be called "abnormality in charging system"). This routine is repeatedly executed each time a given time passes (e.g., every second) when no abnormality is detected in the charging system.

Once the abnormality display processing routine is executed, the CPU 52 of the main ECU 50 initially determines whether an abnormality is detected in the charging system (step S100). A process of detecting an abnormality in the charging system includes function check of the charger 72, function check of the connector 73, failure check of the connection switch 74, disconnection check of signal lines with the charger 72 and the connection switch 74, which are all performed by the charge ECU 76. The abnormality detection process of the charging system also includes check for an abnormality in communications between the main ECU 50 and the charge ECU 76. If any of various abnormalities as well as abnormalities in the charging system is detected, the abnormality is classified based on its location and type, and an abnormality determination flag is set, and stored in the EEPROM 58. Accordingly, in step S100, it is determined whether an abnormality is detected in the charging system, based on the abnormality determination flag. If no abnormality is detected in the charging system, there is no need to display a message about an abnormality, and this cycle of the routine ends.

On the other hand, if any abnormality is detected in the charging system, it is determined whether the detected abnormality in the charging system is an abnormality that affects traveling of the vehicle (step S110). Abnormalities that affect traveling, out of abnormalities in the charging system, include a malfunction of the connector 73, a malfunction of the connection switch 74, an abnormality in communications with the charge ECU 76, and so forth. When the connector 73 of the charger 72 is connected to the external power supply 79, control for stopping traveling is performed in this embodiment. However, if a malfunction occurs in the connector 73, or a malfunction occurs in the connection switch 74, it cannot be determined whether external charging is being performed, and it cannot also be determined whether control for stopping traveling is to be performed. Therefore, in this embodiment, a malfunction of the connector 73 and a malfunction of the connection switch 74 are classified as abnormalities that affect traveling. Also, if an abnormality occurs in communications between the main ECU 50 and the charge ECU 76, the main ECU 50 cannot receive a malfunction of the connector 73 and a malfunction of the connection switch 74. Therefore, an abnormality in communications with the charge ECU 76, as well as a malfunction of the connector 73 and a malfunction of the connection switch 74, is also classified as an abnormality that affects traveling. On the other hand, abnormalities that do not affect traveling, out of abnormalities in the charging system, include a malfunction of the charger 72, and so forth. The malfunction of the charger 72 merely makes it impossible to charge the battery 42 successfully, when the battery 42 is charged using electric power from the external power supply 79, and does not affect traveling; therefore, the malfunction of the charger 72 is classified as an abnormality that does not affect traveling, in this embodiment.

If it is determined in step S110 that the abnormality in the charging system is an abnormality that affects traveling, a message to the effect that there is an abnormality that affects traveling, for example, a message, such as "SYSTEM FAILURE IN DRIVE SYSTEM", is immediately displayed on the display device 69 (step S120), and this cycle of the routine ends. In this manner, the driver is immediately informed of occurrence of the abnormality that affects traveling, and is able to drive the vehicle in a limp-home mode and stop the vehicle.

If it is determined in step S110 that the abnormality in the charge system is an abnormality that does not affect traveling, the CPU 52 waits until the next trip is started (step S130), and a message to the effect that there is an abnormality in the charge system, for example, a message, such as "CHARGING SYSTEM FAILURE", is displayed on the display device 69 (step S140). Then, the current cycle of this routine ends. In this manner, the driver can be informed of occurrence of the abnormality in the charging system 70 before start of traveling. Here, the time at which the next trip is started may be considered as a point in time immediately after the abnormality is detected when the system is started next time. More specifically, a value for display, which is used for executing control for displaying a message to the effect that there is an abnormality in the charging system, on the display device 69, is set to a flag that is checked in an abnormality detection process at the start of the system. In the abnormality detection process at the next start of the system, the value of the flag is checked, and the message to the effect that there is an abnormality in the charging system is displayed on the display device 69 when the value is the above-indicated value for display.

In the electric vehicle 20 of the embodiment as described above, when an abnormality is detected in the charging system, it is determined whether the abnormality in the charging system is an abnormality that affects traveling. If it is determined that the abnormality in the charging system is an abnormality that affects traveling, the message to the effect that there is an abnormality that affects traveling is immediately displayed on the display device 69. In this manner, the driver can be immediately informed of occurrence of the abnormality that affects traveling, and can drive the vehicle in the limp-home mode and stop the vehicle. On the other hand, if it is determined that the abnormality in the charging system is an abnormality that does not affect traveling, the CPU 52 waits until the next trip is started, and the massage to the effect that there is an abnormality in the charging system is displayed on the display device 69. In this manner, the driver can be informed of occurrence of the abnormality in the charging system 70 before the start of traveling, and can avoid an inconvenience (e.g., excessive reaction of the driver to the message about the abnormality) that would arise if the abnormality in the charging system, which does not affect traveling, is displayed on the display device 69 during traveling. Consequently, when an abnormality occurs in the charging system, the driver is informed of the abnormality at an appropriate time.

Figure 3:
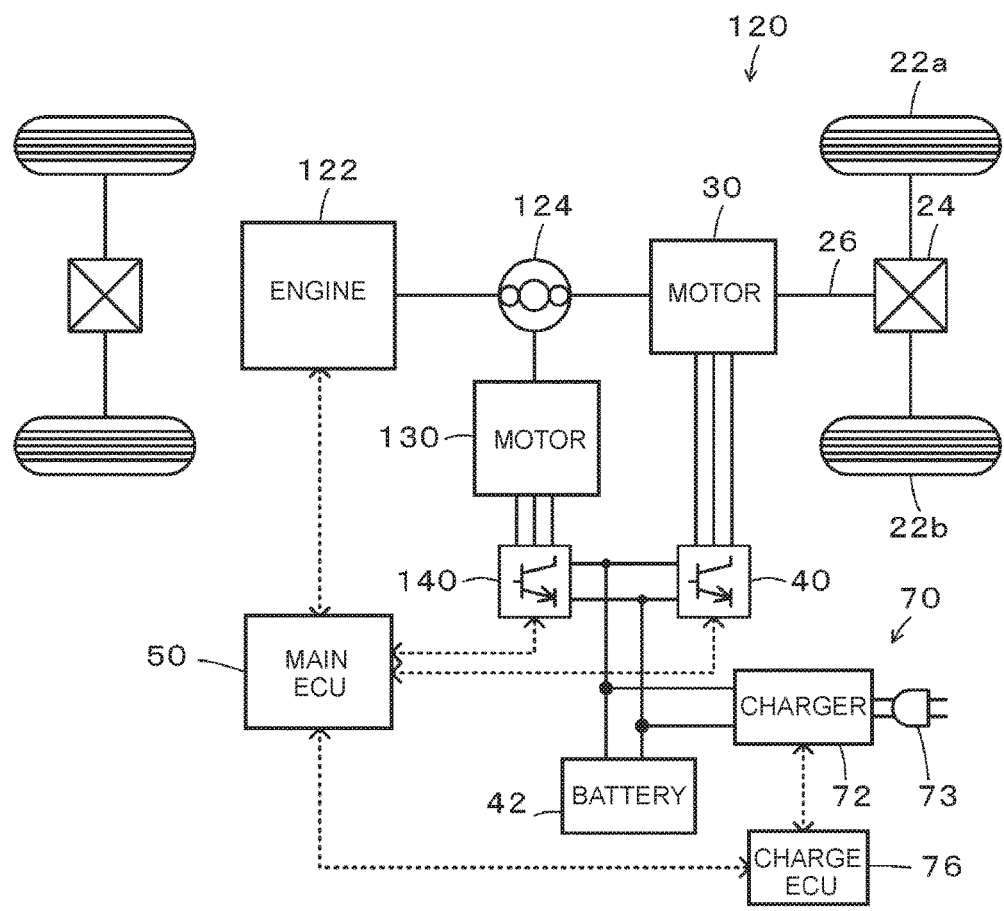
FIG. 3 is a view schematically showing the configuration of a plug-in hybrid vehicle as another example.

In the above embodiment, the electric vehicle 20 includes the motor 30, inverter 40, battery 42, and the charging system 70. However, the disclosure may also be applied to a plug-in hybrid vehicle 120 as shown in FIG. 3 by way of example. The plug-in hybrid vehicle 120 includes an engine 122, planetary gear unit 124, motor 130, inverter 140, and the charging system 70, in addition to the motor 30, inverter 40, and the battery 42. In this example, the planetary gear unit 124 has a sun gear to which the motor 130 is connected, a carrier to which the engine 122 is connected, and a ring gear to which the drive shaft 26 and the motor 30 are connected. The inverter 140 drives the motor 130, and supplies and receives electric power to and from the battery 42. In the hybrid vehicle 120, the main ECU 50 performs drive control such that the hybrid vehicle 120 travels in a hybrid traveling (HV traveling) mode, or in an electric traveling (EV traveling) mode. In the hybrid traveling mode, the engine 122 is operated, and the hybrid vehicle 120 travels with power from the engine 122 and power from the motors 30, 130. In the electric traveling mode, the engine 122 is not operated, and the hybrid vehicle 120 travels with power from the motor 30. With this arrangement, if an abnormality detected in the charging system is an abnormality that affects traveling, a message, such as "HYBRID SYSTEM FAILURE", is displayed on the display device 69. If the abnormality detected in the charging system is an abnormality that does not affect traveling, a message, such as "PLUG-IN CHARGING SYSTEM FAILURE", may be displayed on the display device 69.

In the electric vehicle 20 of the above embodiment, the message about occurrence of an abnormality is displayed on the display device 69. However, the message about occurrence of an abnormality may be displayed on the display device 69 and also generated by voice, or the message about occurrence of an abnormality may be generated by voice, without being displayed.

This disclosure may be applied to an automotive vehicle having any configuration, provided that a motor for traveling, a battery that can supply electric power to the motor, and a charging system that charges the battery, are installed on the vehicle.

In the embodiment, the motor 30 functions as "motor" of this disclosure, and the battery 42 functions as "battery" of this disclosure, while the charging system 70 functions as "charging system" of this disclosure, and the main ECU 50 that executes the abnormality display processing routine of FIG. 2 and the display device 69 function as "abnormality informing unit" of this disclosure.

While the embodiment has been described above, the disclosure is not limited to this embodiment, but may be embodied in various forms, without departing from the principle of the disclosure.

The disclosure may be utilized in manufacturing industries of automobile vehicles, for example.

What is claimed is:

1. An automotive vehicle comprising:
   a motor for traveling;
   a battery configured to supply electric power to the motor;
   a charging system configured to charge the battery; and
   an abnormality informing unit including a controller, the abnormality informing unit being configured to:
   determine whether an abnormality detected in a current trip is a first abnormality that regards the charging system and that affects traveling or a second abnormality that does not affect traveling;
   immediately inform occurrence of the detected abnormality when the detected abnormality is detected, on a condition that the detected abnormality is the first abnormality; and
   inform occurrence of the detected abnormality when a next trip is started, the next trip following system startup after the current trip, on a condition that the detected abnormality is the second abnormality.

2. The automotive vehicle according to claim 1, wherein the abnormality informing unit is configured to:
   i) inform occurrence of an abnormality that affects traveling when the detected abnormality is the first abnormality; and
   ii) inform occurrence of an abnormality regarding the charging system when the detected abnormality is the second abnormality.

3. The automotive vehicle according to claim 1, wherein:
   the charging system includes a charger configured to charge the battery using electric power from an external power supply; and
   the abnormality that affects traveling includes at least one of a communication abnormality in the charging system and a malfunction of a connector configured to connect the charger with the external power supply in the charging system, and the abnormality that does not affect traveling includes an abnormality regarding a charging function of the charging system.

* * * * *